(No Model.)
P. G. TOEPFER.
APPARATUS FOR GERMINATING GRAIN.
No. 437,950. Patented Oct. 7, 1890.
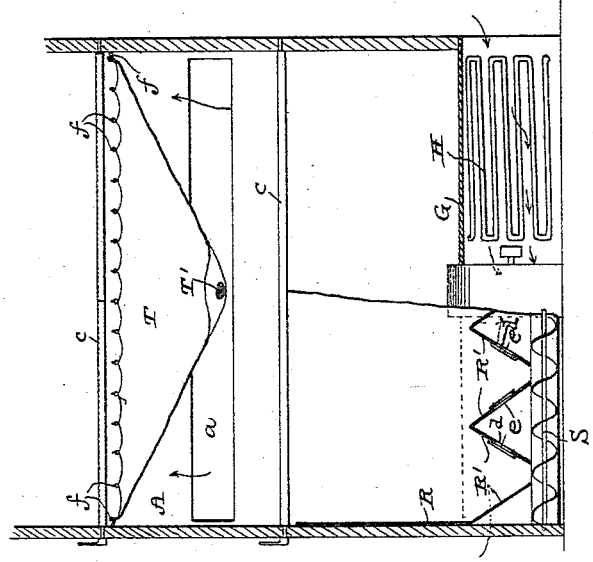
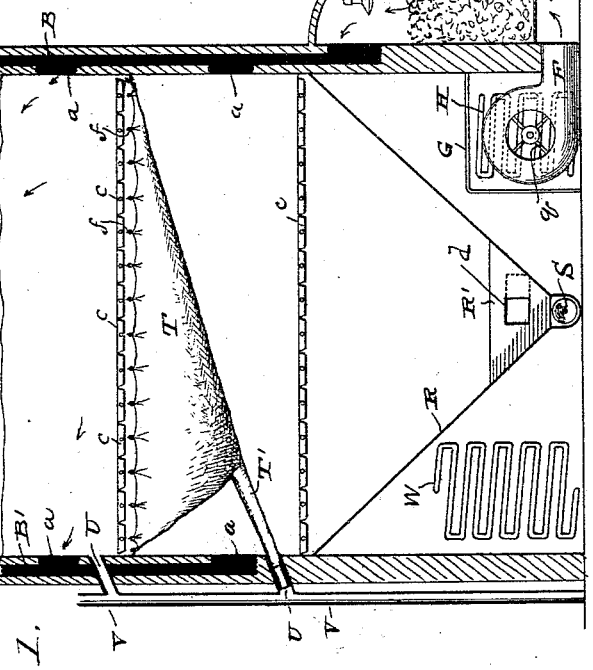
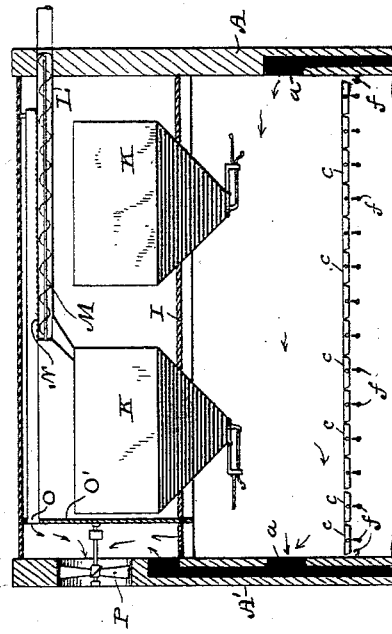
Witnesses
Geo. W. Young
William Klug
Inventor
Peter G. Toepfer
By Stunt &c.
Attorneys

UNITED STATES PATENT OFFICE.

PETER G. TOEPFER, OF MILWAUKEE, WISCONSIN.

APPARATUS FOR GERMINATING GRAIN.

SPECIFICATION forming part of Letters Patent No. 437,950, dated October 7, 1890.

Application filed May 21, 1889. Serial No. 311,549. (No model.)

*To all whom it may concern:*

Be it known that I, PETER G. TOEPFER, of Milwaukee, in the county of Milwaukee, and in the State of Wisconsin, have invented certain new and useful Improvements in Apparatus for Germinating Grain; and I do hereby declare that the following is a full, clear, and exact description thereof.

My invention relates to apparatus for germinating grain preparatory to malting it; and the invention consists in certain peculiar and novel features of construction and arrangement, as hereinafter described, and pointed out in the appended claims.

In the drawings, Figure 1 is a vertical section of a steeping and germinating room, taken at right angles to the length of the trays that form the floors of the steeping-room, and embodying my invention. Fig. 2 is a broken section of the lower portion of the steeping and germinating room, taken at right angles to the section in Fig. 1.

A A' are the side walls of the steeping and germinating room, which are formed with vertical flues B B', opening into the room at various points through lateral ports $a$. The flue B leads from a chamber C, which contains coke or other porous material D, said material being supported by a perforated bottom plate E, located above the nozzle of a fan-case F within the chamber C. Above the material D is arranged a spraying-nozzle F', which communicates with a suitable water-supply. The fan-case F is covered by an arch G, which communicates with the open air on each side, and coils H are located in this arch, and are connected with either a cold-air supply or a steam or hot-air supply, according to the temperature of air desired for the germinating-room.

Each floor is composed of a series of dumping-trays $c$, and above the highest tray-floor is a ceiling I, through which the hoppers K project, and are fed through a trough L by a conveyer M, and the trough L is covered by a screen N, which prevents the overflow of the grain, but permits any dust and other light foreign matter that may be mixed with the grain to be carried off through an opening O in partition O' by a fan P. This fan is located in the upper portion of wall A', and acts to aid the lower fan $q$ in changing the air in the germinating-room.

To receive the grain from the lower floor, I provide a hopper R beneath the lower tray-floor, and preferably I provide this hopper with spouts R', leading to a conveyer S, which takes off the grain as it falls through the spouts. In order that air may be drawn through the grain on the lower floor by the fan P when the lower hopper is empty, I provide the hopper-spouts R' with openings $d$, which may be entirely or partly covered, as desired, by slides $e$.

To facilitate the washing of the floors separately—that is, the washing of one floor while the others are loaded—I place a series of hooks $f$ on the interior of the walls just beneath the edges of the floors, and when a single tray-floor is to be washed I hang to the hooks beneath it a flexible water-proof bag T. This bag has an outlet-pipe T', which I project into one of the branches U, that projects from a pipe V, extending up against or near the wall A', and thus carries off the water used in washing the superadjacent tray-floor. Hence this tray-floor or any other of the floors may be washed while all the other floors are filled without injury to the contents of the latter.

In using my apparatus the dry grain is first conveyed to the upper hoppers K, and on its way thereto through the trough L the chaff and dust are drawn from it by the fan P. The grain is then steeped in the hoppers K and dropped on the first floor, remaining there until it has undergone the first stage of germination, after which it is dumped to the next floor, and the upper floor is replenished by fresh grain. Thus as the grain passes through the successive stages of germination it is dumped from one floor to the other until it finally reaches the lower hopper R.

While the grain is germinating on the floors it is supplied with moist air of the proper temperature from the fan $q$, and after passing through the material in the chamber C, the moisture is produced by the spray from nozzle F' before the air reaches flue B, which, together with flue B', conducts the air into the germinating-room.

In the lower portion of the germinating-room and to one side of hopper R is arranged a steam or hot-air coil W, and when the hopper is empty the gates e are opened to permit air, which enters the lower portion of the room and is heated by the coil W, to be drawn up through the lower tray by the fan P to partly dry the grain on the lower floor before it is dumped in the hopper.

The trays forming the floors are preferably perforated to permit the air to pass freely through the grain.

Having thus fully described my invention, what I claim as new, and desire to secure by Letters Patent, is—

1. An apparatus for germinating grain, comprising an inclosing house or structure, vertical flues in its walls communicating laterally with the interior of the structure, a chamber arranged to contain air-enriching material and communicating with said flues at their lower ends, an air-moistening contrivance located within said chamber, a compartment located in the bottom of the structure, means for heating or cooling the air, and an air-blower also located in said compartment and communicating with the chamber adapted to moisten the air, a series of floors composed each of a number of tilting trays and arranged one above the other within said structure between the flue-openings, and a suction-fan located in the upper part of the structure, all substantially as described.

2. An apparatus for germinating grain, comprising an inclosing house or structure containing a series of floors arranged one above the other within said structure, vertical flues located in the walls of said structure and opening therein between the floors thereof, one or more hoppers located in the upper part of the structure, means for conveying grain to said hoppers, an exhaust-fan also located in said part of the structure, an air-heating appliance for drying the malted grain, a compartment in the bottom of the structure, an air heating or cooling contrivance, an air-blower located in said compartment, a chamber communicating with the fan and air-flues, and an air-moistening contrivance in said chamber, substantially as described.

3. The combination, with the germinating-room having a floor consisting of a series of dumping-trays and suitably-arranged hooks in its walls, of a water-proof bag adapted for being hung to these hooks, and having a drain-spout, as described.

In testimony that I claim the foregoing I have hereunto set my hand, at Milwaukee, in the county of Milwaukee and State of Wisconsin, in the presence of two witnesses.

PETER G. TOEPFER.

Witnesses:
S. S. STOUT,
H. G. UNDERWOOD.